(No Model.)

J. A. HORTON.
LOOSE PULLEY.

No. 313,497. Patented Mar. 10, 1885.

Witnesses.
H. Brown.
R. J. Powers

Inventor
James A. Horton
by Wright & Brown
Attys.

UNITED STATES PATENT OFFICE.

JAMES A. HORTON, OF READING, MASSACHUSETTS.

LOOSE PULLEY.

SPECIFICATION forming part of Letters Patent No. 313,497, dated March 10, 1885.

Application filed December 9, 1884. (No model.)

*To all whom it may concern:*

Be it known that I, JAMES A. HORTON, of Reading, in the county of Middlesex and State of Massachusetts, have invented certain Improvements in Loose Pulleys, of which the following is a specification.

This invention has for its object to provide improved means for lubricating loose pulleys, whereby the necessity of frequent oiling may be obviated and the liability of wear and injury caused by the running of the pulley when not sufficiently lubricated may be diminished.

To these ends the invention consists in a series of chambers or pockets so arranged as to contain a supply of oil and supply the same to the bearing-surfaces of the pulley and the shaft on which it is mounted, said pockets communicating with a chamber having a supply-opening through which oil may be introduced from the exterior of the pulley, as I will now proceed to describe.

Figure 1:
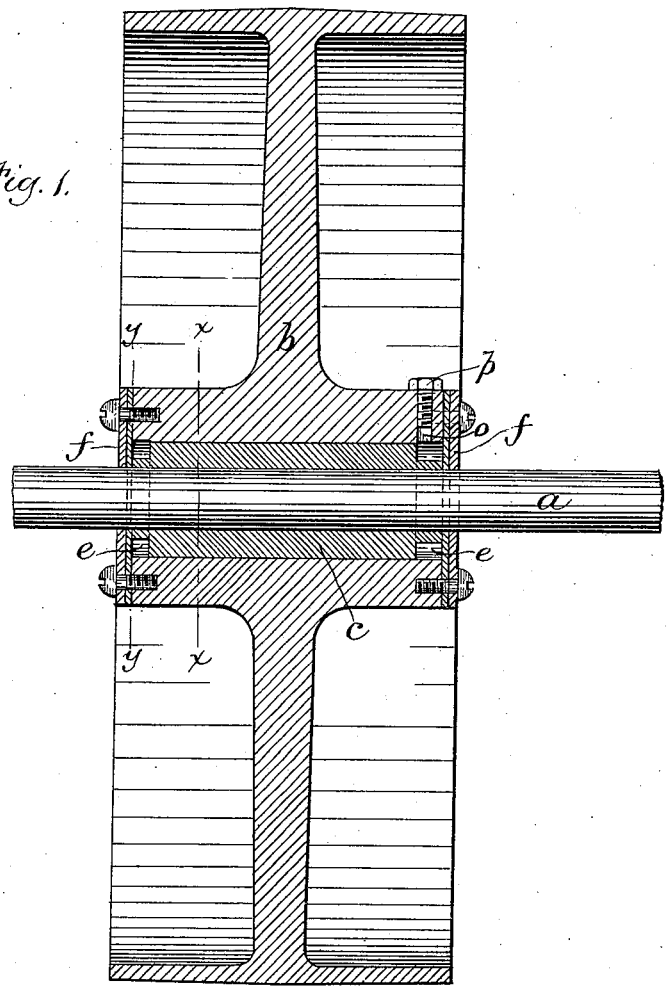
Figure 2:
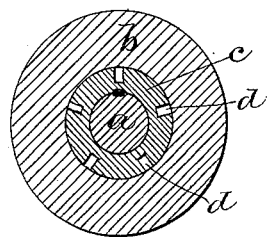
Figure 3:
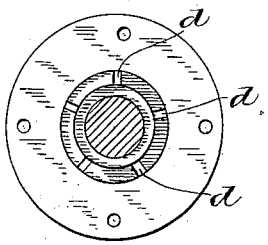

Of the accompanying drawings, forming a part of this specification, Figure 1 represents a side view of a shaft and a sectional view of a pulley located thereon. Figs. 2 and 3 represent, respectively, sections on line $x$ $x$ and $y$ $y$, Fig. 1.

The same letters of reference indicate the same parts in all the figures.

In the drawings, $a$ represents a shaft, and $b$ a loose pulley thereon.

In carrying out my invention I secure rigidly to the shaft a collar, $c$, which forms the bearing on which the loose pulley runs. In the periphery of said collar are formed any desired number of grooves or pockets $d$. The periphery of the collar is cut away at the ends thereof to form annular spaces $e$ $e$, with which the grooves or pockets $d$ communicate.

To the ends of the hub of the pulley are affixed flanges $f$, which extend inwardly to the periphery of the shaft and form the outer side of the spaces $e$ $e$. Annular packings of leather, paper, or other suitable material are clamped by the flanges $ff$ against the ends of the hub to form oil-tight joints. An orifice, $o$, is formed through the hub of the pulley into one of the annular spaces $e$, for the introduction of oil, said orifice being provided with a screw-plug, $p$, or other removable closing device.

It will be seen that oil introduced through the orifice will fill the annular spaces $e$ $e$ and the communicating grooves or pockets $d$, the oil being prevented from escaping at the ends of the hub by the flanges $ff$. When the pulley is running loosely on the shaft, the oil is supplied to the bearing-surfaces of the shaft and pulley from the pockets, the pockets and the annular spaces holding enough oil to keep the bearings lubricated for a considerable length of time. The ends of the collar $c$ form shoulders, which prevent lateral movement of the pulley on the shaft.

It is obvious that an annular space may be provided at one end of the series of pockets, instead of at both ends.

A single pocket may be used instead of a series without departing from the spirit of my invention.

I claim—

1. The combination of a loose pulley having a covered oil-receiving orifice, a shaft on which said pulley is mounted, and one or more pockets communicating with the bearing-surfaces of the shaft and pulley, and with the oil-receiving orifice of the pulley, as set forth.

2. The combination of the shaft having the fixed collar or enlargement $c$, the pulley mounted on said enlargement and having flanges bearing against the ends thereof, and an oil pocket or pockets communicating with the bearing-surfaces of the enlargement and pulley, and with an oil-receiving orifice in the pulley, as set forth.

3. The shaft having the fixed collar or enlargement reduced at one or both ends to form an annular space or spaces, and provided with one or more longitudinal pockets communicating with said spaces, combined with the loose pulley having the covered oil-receiving orifice communicating with one of the annular spaces, and the end flanges and packings bearing against the ends of said collar, as set forth.

In testimony whereof I have signed my name to this specification, in the presence of two subscribing witnesses, this 22d day of November, 1884.

JAMES A. HORTON.

Witnesses:
C. F. BROWN,
R. J. POWERS.